A. HASPER.
GRAIN STACKER.
APPLICATION FILED MAY 3, 1910.
971,995.
Patented Oct. 4, 1910.
2 SHEETS—SHEET 2.
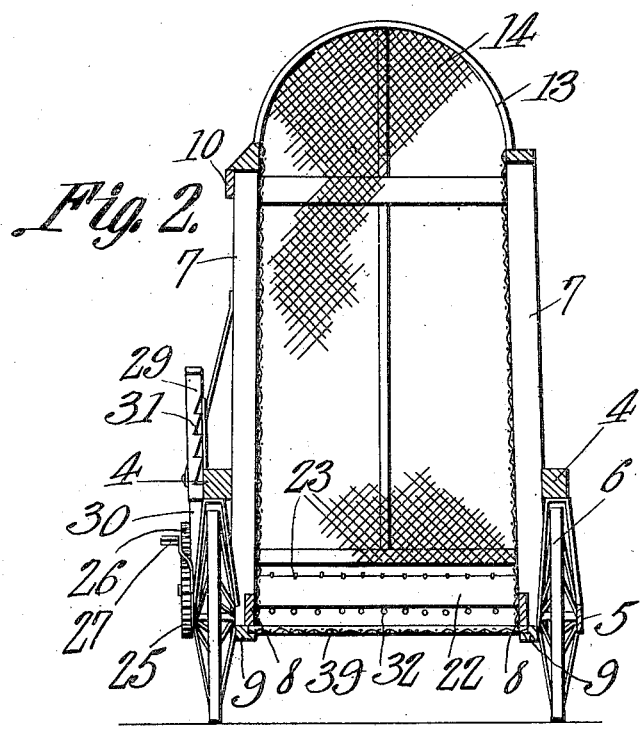
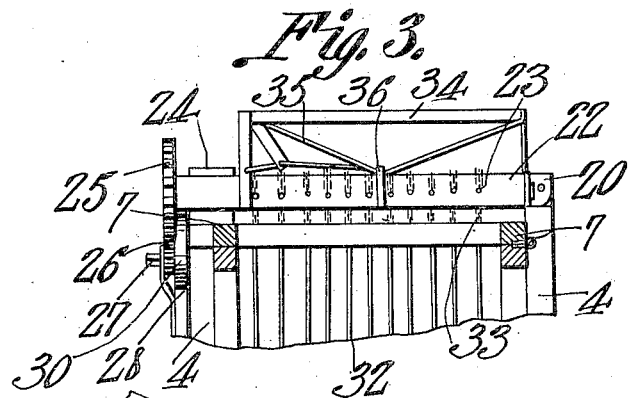
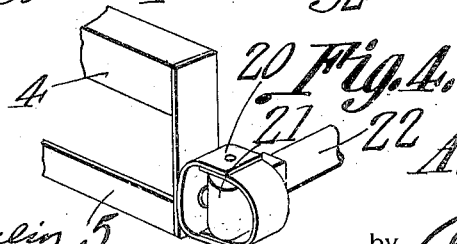
Arend Hasper
Inventor
Witnesses
by C. A. Snow & Co.
Attorneys

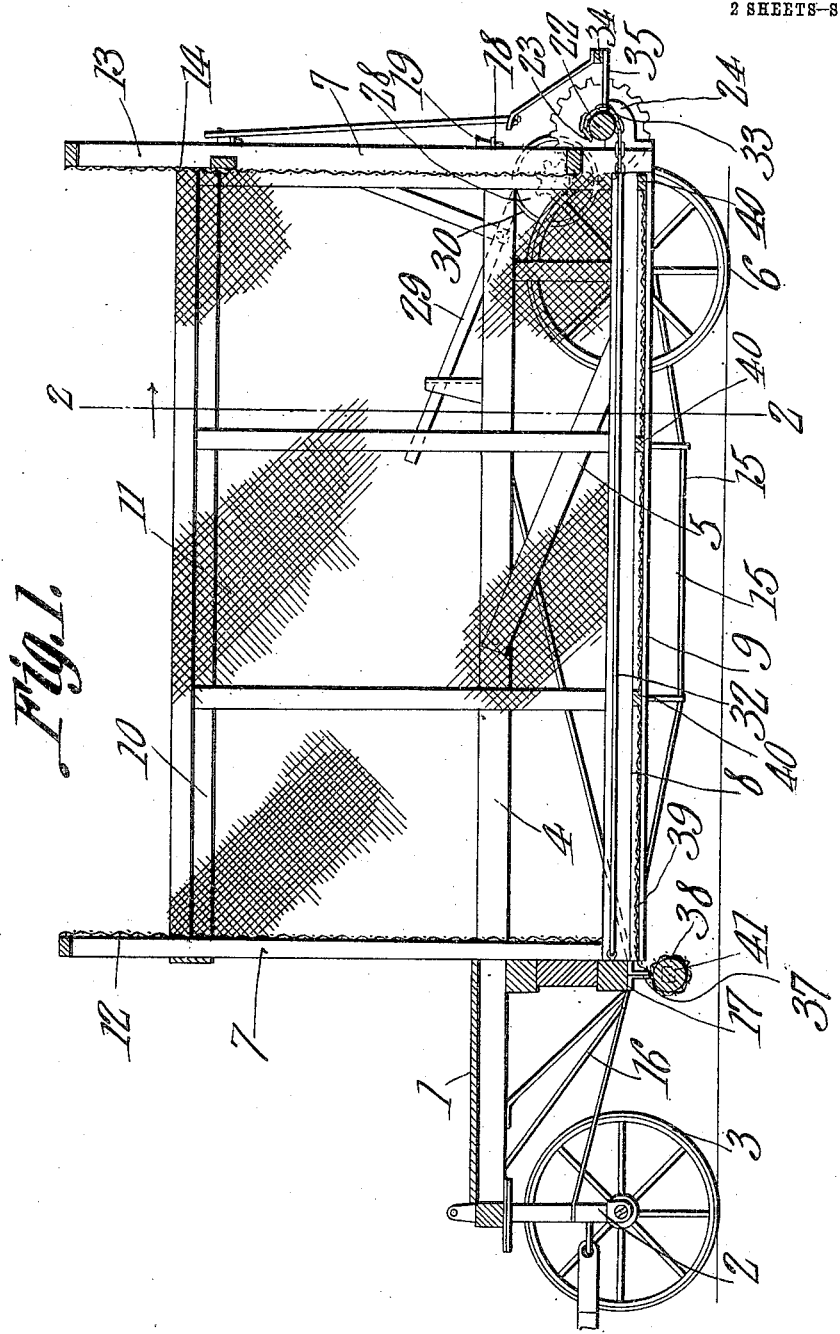

UNITED STATES PATENT OFFICE.

AREND HASPER, OF WESTFIELD, NORTH DAKOTA.

GRAIN-STACKER.

971,995.   Specification of Letters Patent.   Patented Oct. 4, 1910.

Application filed May 3, 1910. Serial No. 559,076.

*To all whom it may concern:*

Be it known that I, AREND HASPER, a citizen of the United States, residing at Westfield, in the county of Emmons and State of North Dakota, have invented a new and useful Grain-Stacker, of which the following is a specification.

This invention relates to a grain stacker and it consists in the novel construction and arrangement of its parts as hereinafter shown and described.

The object of the invention is to provide a stacker in the form of a receptacle mounted upon wheels and adapted to travel adjacent upon a harvester or header and receive the grain from the same. When the stacker has accumulated its complement of grain it may be drawn to any desired point where the stack is to be placed and when at the proper point the bottom of the stacker may be withdrawn in sections whereby its contents may be permitted to gravitate gradually and become positioned upon the ground. After this has been accomplished means are provided for removing or swinging the end of the stacker so that the body portion thereof may be drawn from about the stack positioned upon the ground thus leaving the material in proper condition to mature preparatory to being threshed.

In the accompanying drawings:—Figure 1 is a vertical longitudinal sectional view of the stacker. Fig. 2 is a transverse sectional view of the same on the line 2—2 of Fig. 1. Fig. 3 is a horizontal sectional view of the rear portion of the stacker. Fig. 4 is a perspective view of a portion of the stacker.

The frame of the stacker includes a forward platform 1 mounted upon a pivoted axle 2 which in turn is supported upon ground wheels 3. The side beams 4 extend rearwardly from the platform 1 and are provided with depending brackets 5 in which are journaled rear supporting wheels 6.

Uprights 7 are attached to the inner sides of the rails 4 and are connected together at their lower ends by beams 8. Guides 9 are located at the lower edges of the beams 8 and their function will be explained hereinafter. As illustrated in Fig. 2 of the drawings, the upright 7 at one side of the stacker inclines slightly toward the uprights 7 at the opposite sides thereof and the said uprights at their upper ends are connected together by longitudinally disposed beams 10. The uprights 7 and beams 8 and 10 at the opposite sides of the stacker form frames which carry screen material 11 and the said screen material together with the said uprights and beams constitute the opposite sides of the stacker. Screen material 12 is attached to the uprights at the forward end of the stacker and forms the forward end thereof. At the rear end of the stacker is provided a gate 13 which is hinged at one edge to one side of the stacker and which is provided with a screen material 14. Truss rods 15 are located under the lower beam 8 and suitable braces 16 are provided for sustaining the platform 1 in proper relation with respect to a cross beam 17 which connects the forward end of the beams 8 together.

The end gate 13 is provided at its free edge portion with openings which receive staples 18 attached to one of the hindmost uprights 7 and after the rear end portions of the said staples 18 are projected through or beyond the rear surface of the end gate 13 they are adapted to receive securing pins 19.

A cap 20 is pivotally connected with one of the hindmost uprights 7 and a block 21 is pivoted in said cap. One end of a shaft 22 is journaled in the block 21 and the said shaft is provided at intervals along its length with a series of approximately radially disposed pins 23. At the opposite side of the stacker from that at which the cap 20 is located, is located a shaft bearing 24 which is adapted to receive the opposite end portions of the said shaft 22. A gear wheel 25 is mounted upon the free end portion of the shaft 22 and is adapted to mesh with a gear pinion 26 when the shaft 22 is journaled in the half bearing 24, as illustrated in Fig. 3 of the drawings. The pinion 26 is fixed to a stub shaft 27 which is provided with a squared projection as illustrated in the said figure and a friction disk 28 is also fixed to the said stub shaft 27. A lever 29 is fulcrumed at the side of the stacker and at its working end is attached to a band 30 which is adapted to engage frictionally the periphery of the disk 28. A rack 31 is carried at the side of the stacker adjacent the free end portion of the lever 29 and is adapted to be engaged by the said rack whereby the lever may be held in an adjusted position so that the band 30 may be held in frictional contact with the disk 28.

A series of cables 32 are connected at their forward ends with the cross beam 17 and are provided at their rear ends with chain sections 33. The links of the chain sections 33 are adapted to receive the pins 23 upon the shaft 22. While the cables 32 possess a certain amount of flexibility, the chain sections 33 are susceptible of flexibility to a greater extent and thus prevent said cables from becoming knotted when they are subjected to the weight of a load or are being withdrawn from under the same as will be explained presently.

A frame 34 extends rearwardly from the shaft 22 and truss rods 35 are attached at their ends with the end portions of the said frame and are connected at their intermediate portions with a band 36 which surrounds the intermediate portion of the said shaft and thus the intermediate portion of the shaft is braced by said frame 34.

Inasmuch as the supporting wheels 6 at the opposite sides of the stacker are not connected directly together by an axle the shaft 22 extending transversely across the rear portion of the stacker forms a bracing means for the entire rear portion of the device.

After the device has been removed from the body of a stack in the manner as indicated, the parts may be repositioned as illustrated in Fig. 1 of the drawings when the stacker may be used for accumulating material to constitute another stack.

Brackets 37 depend from the cross beam 17 and a roller 38 is journaled in the said brackets. The forward end of a bottom screen 39 is attached to the said roller 38 and the screen 39 is provided at intervals along its length with cross slats 40, the ends of which are slidably carried by the guides 9. The shaft of the roller 38 is provided at one or both ends with a non-circular extremity 41 to which a wrench may be applied for the purpose of turning the said roller to wind the screen 39 thereon.

In operation the stacker is drawn (preferably by means of draft animals) adjacent the delivery end of a harvester or header and the material coming from the harvester or header is carried over one of the sides of the stacker and deposited between the sides thereof. An operative is located within the stacker and properly spreads the material to form the subsequent stack. After the stacker has accumulated its complement of material it may be transported to the point at which the stack is to be placed and then the screen 39 is wound upon the roller 38. The free end portion of the lever 29 is then disengaged from the rack 31 and the band 30 is loosened about the periphery of the disk 28. Therefore the shaft 22 is free to rotate and under the stress of the weight of material carried by the cables 32 the said shaft 22 is rotated and the pins 23 are removed from an uppermost position to a downwardly disposed position. When this occurs the links of the chain 33 fall from the said pins and the said chains 33 together with the rear end portions of the cables 32 fall to the ground and the contents of the stacker also descend. By reason of the fact that the uprights 7 at the opposite sides of the stacker are inclined toward each other at their upper ends ample room is afforded to permit the material carried by the stacker to gravitate readily as indicated. After the material carried by the stacker is lowered to the ground, as indicated, the free end portion of the shaft 22 is slightly elevated to disengage the half bearings 24 and then the shaft 22 is swung rearwardly upon the pivot of the block 21. After the shaft 22 is swung out of the way, the pin 19 may be removed from the staples 18 and the free edge portion of the gate 13 is swung rearwardly. After the material has been lowered to the ground and the gate and shaft has been swung rearwardly, as indicated, the entire device is drawn in a forward direction which draws the cables 32 and chain sections 33 from under the stack and thus the stack is properly positioned upon the ground and the device is removed from the same. If the bottom screen 39 during the time that it is withdrawn from under the material contained within the stacker should have any of the said material upon its upper surface, the said material may be removed at the time that the said screen is wound upon the roller 38.

Having described the invention what I claim as new and desire to secure by Letters Patent is:—

1. A stacker comprising a frame, side uprights mounted thereon and inclined toward each other at their upper ends, an end gate hinged at one edge to one side of the stacker, and a removable bottom for the stacker.

2. A stacker comprising a frame, side uprights located at the sides thereof, a hinged gate attached to one side, and a bottom adapted to be removed from under the sides and end of the stacker.

3. A stacker comprising a frame, uprights located at the sides thereof, an end gate hinged at one edge to one side of the stacker, a shaft pivotally and hingedly mounted at one side of stacker, cables connected at their forward ends to the forward portion of the stacker and connected at their rear ends with said shaft, and means for holding the shaft in a closed position across the rear end of the stacker.

4. A stacker comprising a frame, uprights located at the sides thereof, an end gate hinged at one side of the frame, a shaft pivotally and hingedly attached to one side of the frame, cables connected at their forward ends with the forward portion of the frame, chain sections attached to the rear ends of the cable, said shaft carrying pins adapted to enter the links of the chain, a locking device for holding the shaft against rotation, means for holding the shaft in a closed position across the end of the stacker, and a removable foraminous bottom located below said cables.

5. A stacker comprising a frame, uprights located at the sides thereof, an end gate hinged at its edge to one side of the frame, a shaft pivotally and hingedly connected at one end to one side of the frame, means for holding said shaft against rotation, means for holding the shaft in closed position across the rear end of the stacker, outstanding pins carried by the shaft, cables connected at their forward ends to the forward portion of the stacker, link sections attached to the rear ends of said cables and adapted to engage the pins carried by the shaft, a roller journaled at the forward portion of the stacker, guides extending longitudinally of the stacker and at the opposite sides thereof, a screen arranged to wind upon said roller and having slats located at their ends in said guides, said screen normally forming a bottom for the stacker and located below said cables.

In testimony that I claim the foregoing as my own, I have hereto affixed my signature in the presence of two witnesses.

AREND HASPER.

Witnesses:
S. A. FISCHER,
LOUIS DORNBUSH.